US010682704B2

(12) United States Patent
Swanner, Jr. et al.

(10) Patent No.: US 10,682,704 B2
(45) Date of Patent: Jun. 16, 2020

(54) MATERIAL EXTRACTION TOOL

(71) Applicant: General Electric Company, Schenectady, NY (US)

(72) Inventors: Archie Lee Swanner, Jr., Easley, SC (US); Tiffany Muller Craft, Simpsonville, SC (US); Donnell Eugene Crear, Simpsonville, SC (US); Kassy Moy Hart, Greenville, SC (US); Tony Lee Stedge, Atlanta, GA (US)

(73) Assignee: General Electric Company, Schenectady, NY (US)

(*) Notice: Subject to any disclaimer, the term of this patent is extended or adjusted under 35 U.S.C. 154(b) by 224 days.

(21) Appl. No.: 15/413,715

(22) Filed: Jan. 24, 2017

(65) Prior Publication Data
US 2018/0207889 A1 Jul. 26, 2018

(51) Int. Cl.
*B33Y 30/00* (2015.01)
*B33Y 40/00* (2020.01)
(Continued)

(52) U.S. Cl.
CPC .................. *B22F 3/24* (2013.01); *B08B 9/08* (2013.01); *B08B 9/093* (2013.01); *B22F 5/009* (2013.01); *B29C 64/20* (2017.08); *B29C 64/35* (2017.08); *B33Y 30/00* (2014.12); *B33Y 40/00* (2014.12); *B33Y 80/00* (2014.12); *F16L 39/00* (2013.01); *B22F 3/1055* (2013.01); *B22F 5/10* (2013.01); *B22F 2003/1056* (2013.01); *B22F 2003/1059* (2013.01); *B22F 2003/247* (2013.01);
(Continued)

(58) Field of Classification Search
CPC ........... B08B 9/093; B29C 64/35; F16L 23/16
See application file for complete search history.

(56) References Cited

U.S. PATENT DOCUMENTS 3,697,420 A 10/1972 Blaisdell et al.
5,308,702 A * 5/1994 Furukimi ............ C22C 33/0207
428/403
(Continued)

FOREIGN PATENT DOCUMENTS

EP 0288728 B2 11/1995
JP 2005153302 A * 6/2005
(Continued)

OTHER PUBLICATIONS

Machine translation of JP2005-153302A (Year: 2005).*
Abstract of JP2005-153302A (Year: 2005).*

*Primary Examiner* — Douglas Lee
(74) *Attorney, Agent, or Firm* — Hoffman Warnick LLC (57) ABSTRACT

Embodiments of the present disclosure relate to a material extraction tool, including: a body shaped to sealingly engage an aperture in a component, the aperture defining a fluid connection between a hollow interior of the component and an exterior of the component; a first passage within the body, the first passage fluidly connecting the hollow interior of the component to an air conduit outside the body, the air conduit fluidly coupled to a compressed air supply; and a second passage within the body, the second passage fluidly connecting the hollow interior of the component to an extraction conduit outside the body, the extraction conduit fluidly coupled to a material repository positioned outside the hollow interior of the component.

11 Claims, 10 Drawing Sheets

(51) Int. Cl.
- *B22F 5/00* (2006.01)
- *B33Y 80/00* (2015.01)
- *B22F 5/10* (2006.01)
- *B22F 3/24* (2006.01)
- *B08B 9/093* (2006.01)
- *B08B 9/08* (2006.01)
- *F16L 39/00* (2006.01)
- *B29C 64/35* (2017.01)
- *B29C 64/20* (2017.01)
- *B33Y 10/00* (2015.01)
- *B22F 3/105* (2006.01)
- *B29C 64/153* (2017.01)

(52) U.S. Cl.
CPC ......... *B22F 2999/00* (2013.01); *B29C 64/153* (2017.08); *B33Y 10/00* (2014.12)

(56) References Cited

U.S. PATENT DOCUMENTS

| | | | |
|---|---|---|---|
| 8,166,908 | B2 * | 5/2012 | Mauchle ............... B05B 7/1404 |
| | | | 118/302 |
| 2002/0090410 | A1 | 7/2002 | Tochimoto et al. |
| 2004/0084814 | A1 | 5/2004 | Boyd et al. |
| 2007/0026145 | A1 | 2/2007 | Lindemann et al. |
| 2010/0200189 | A1 | 8/2010 | Qi et al. |
| 2012/0107496 | A1 | 5/2012 | Thoma |
| 2013/0216813 | A1 * | 8/2013 | Ucok ..................... B22D 19/02 |
| | | | 428/221 |
| 2016/0003156 | A1 | 1/2016 | Hanson |
| 2016/0236293 | A1 | 8/2016 | Chang et al. |

FOREIGN PATENT DOCUMENTS

| | | | |
|---|---|---|---|
| WO | 9411168 | A1 | 5/1994 |
| WO | 2013017144 | A1 | 2/2013 |
| WO | WO-2015016783 | A1 * | 2/2015 ............ B08B 9/093 |

* cited by examiner

MATERIAL EXTRACTION TOOL

BACKGROUND

The disclosure relates generally to a material extraction tool for various components, such as those produced from metal by a laser sintering processes. More particularly, embodiments of the present disclosure provide structures, and program code for a material extraction tool, and methods for using such tools to remove unused material (e.g., residual powder or other granular materials) from a hollow interior of a component.

The pace of change and improvement in the realms of power generation, aviation, and other fields has accompanied extensive research for manufacturing components used in these fields. Conventional manufacture of metallic components generally includes milling or cutting away regions from a slab of metal before treating and modifying the cut metal to yield a part, which may have been simulated using computer models, e.g., in drafting software. Manufactured components which may be formed from metal can include, e.g., airfoil components for installation in a turbomachine such as an aircraft engine or power generation system. The development of additive manufacturing, also known in the art as "3D printing," can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

Additive manufacturing or similar techniques can allow a component to be formed from a reserve of fine metal powder positioned on a build plate, which is processed by an electron beam or laser (e.g., using heat treatments such as sintering) to form a component or sub-component. Additive manufacturing equipment can also form components, e.g., by using three-dimensional models generated with software included within and/or external to the manufacturing equipment. Some devices fabricated via additive manufacture can be formed initially as several distinct components at respective processing stages before being assembled in a subsequent process. One challenge associated with additive manufacturing includes treating the components to remove unused materials, e.g., breakable supports, intermediate connectors and temporary coupling components, and/or other forms of unused material. Some designs may address these concerns by including groups of openings and/or passageways from which such components may be removed, e.g., by gravity and/or operation of external tools. However, such unused materials may be inaccessible or difficult to remove from other components with distinct physical characteristics, e.g., sealed interior spaces and/or connections to other components. The presence of unremoved unused materials in an additively manufactured component may interfere with operation and/or reduce manufacturing efficiency in some cases.

SUMMARY

A first aspect of the disclosure provides a material extraction tool, including: a body shaped to sealingly engage an aperture in a component, the aperture defining a fluid connection between a hollow interior of the component and an exterior of the component; a first passage within the body, the first passage fluidly connecting the hollow interior of the component to an air conduit outside the body, the air conduit fluidly coupled to a compressed air supply; and a second passage within the body, the second passage fluidly connecting the hollow interior of the component to an extraction conduit outside the body, the extraction conduit fluidly coupled to a material repository positioned outside the hollow interior of the component.

A second aspect of the disclosure provides a non-transitory computer readable storage medium storing code representative of a material extraction tool, the material extraction tool being physically generated upon execution of the code, the material extraction tool including: a body shaped to sealingly engage an aperture in a component, the aperture defining a fluid connection between a hollow interior of the component and an exterior of the component; a first passage within the body, the first passage fluidly connecting the hollow interior of the component to an air conduit outside the body, the air conduit fluidly coupled to a compressed air supply; and a second passage within the body, the second passage fluidly connecting the hollow interior of the component to an extraction conduit outside the body, the extraction conduit fluidly coupled to a material repository positioned outside the hollow interior of the component.

A third aspect of the invention provides a method for extracting unused material from a component, the method including: coupling a body of a material extraction tool to an aperture of the component, such that the body separates a hollow interior of the component from an exterior of the component, wherein the body includes a first passage fluidly coupled to an air conduit positioned outside the body, and a second passage fluidly connecting the hollow interior of the component to an extraction conduit positioned outside the body; and injecting a compressed air into the hollow interior of the component through the first passage of the body to extract an unused material from the hollow interior of the component through the second passage to a material repository fluidly coupled to the extraction conduit.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Embodiments of the disclosure provide a material extraction tool shaped to mechanically engage an aperture of a component. In particular, a tool according to the disclosure can prevent fluid communication between the exterior and interior of a component through the aperture being engaged. The tool may be structured to include a body, and a first passage within the body. The first passage can fluidly connect a hollow interior of the component to a supply of compressed air. The tool can also include a second passage within the body for fluidly connecting the hollow interior of the component to a repository for unused material. After manufacturing a component, the component may include unused materials, e.g., powder or other granular materials therein. To remove the unused materials from the component, a user may mechanically couple the tool to an aperture of the component and inject a compressed air through the first aperture to extract the unused materials through the second passage of the tool. The component may then be connected to another component through the aperture, and/or the tool may be reused to remove unused material from other components.

Figure 1:
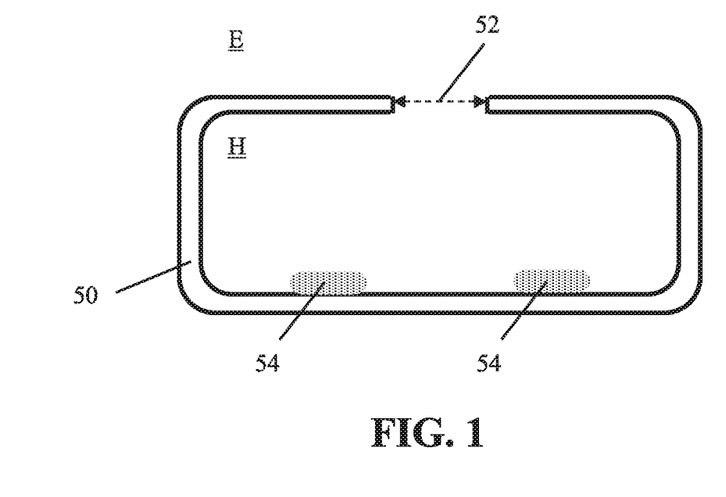
FIG. 1 shows a cross-sectional view of a component with unused material to be removed according to embodiments of the disclosure.

Referring to FIG. 1, a cross-sectional view of a component 50 is shown. Component 50 can include, e.g., a machine and/or portion thereof for a wide number of industrial applications. According to an example, component 50 may be a manufactured portion of a power generation system such as one or more gas turbine assemblies. Component 50 may be manufactured from one or more metals and/or conventional materials for fabricating a machine, component, etc., such as portions of a power generation assembly. In some cases, component 50 may include one or more sintered metals, plastics, starches, etc., as a result of being formed by one or more additive manufacturing techniques. More specifically, component 50 may include, e.g., a portion of a turbine diaphragm having a hollow interior H. Hollow interior H may define a passage for cooling air and/or other materials within component 50 in a larger system. In other embodiments, hollow interior H may be formed simply as a consequence of creating component 50 by additive manufacture. Component 50 can include an aperture 52 connecting hollow interior H to an exterior E of component 50. Manufacturing component 50, e.g., by additive manufacture, subtractive manufacture, and/or other techniques can form one or more regions of deposited unused material 54 (e.g., various forms of residual powder or other granular materials) within hollow interior H. Unused material 54 may constitute waste to be disposed, and/or recyclable material which may be used to form other machines, components, etc. Unused material 54 may be difficult or impossible to remove from hollow interior H by conventional techniques. As discussed herein, embodiments of the present disclosure provide tooling to remove unused material 54 from hollow interior H after component 50 is manufactured. Unused material 54 may include one or more raw and/or unused materials relating to the underlying manufacturing process(es) used to form component 50. Thus, the material composition of unused material 54 can depend upon the material composition of component 50. As examples, unused material may include metal powder, plastic powder, starch powder, other granular materials, etc., remaining within hollow interior H of component 50 after component 50 is wholly or partially manufactured.

Figure 2:
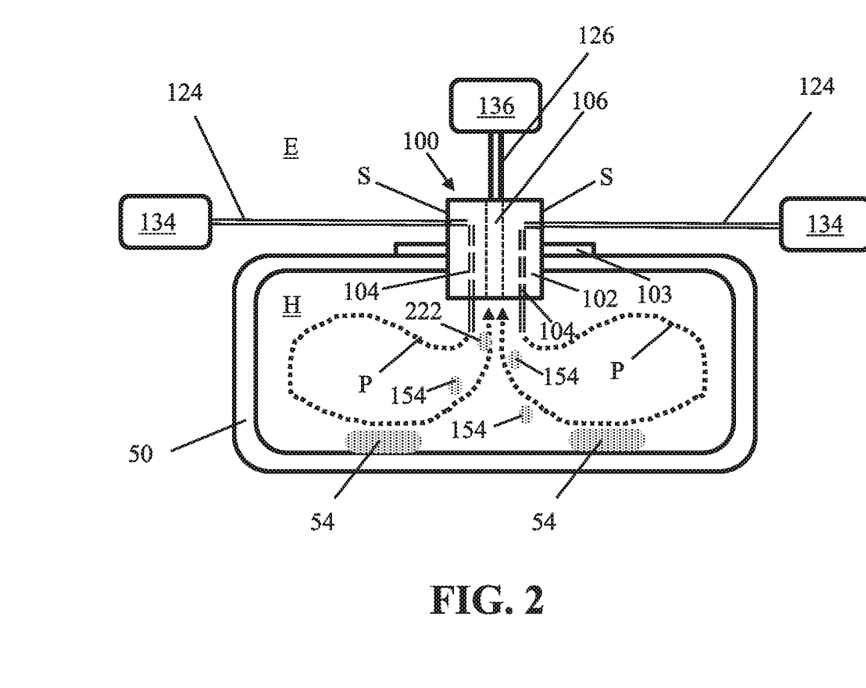
FIG. 2 shows a cross-sectional view of a material extraction tool being used to remove material from a component according to embodiments of the present disclosure.

Turning to FIG. 2, embodiments of the disclosure provide a material extraction tool (simply "tool," hereafter) 100 for removing unused material 54 from component 50. Tool 100 can include various structural features (e.g., passages, apertures, etc., discussed elsewhere herein) shaped to remove one or more unused materials 54 from hollow interior H of component 50. Tool 100 can include a body 102 shaped to sealingly engage aperture 52 (FIG. 1) of component 50 before unused material 54 is removed therefrom. To impede or prevent fluid communication through aperture 52 (e.g., between body 102 of tool 100 and portions of component 50), tool 100 can include one or more sealing elements 103 (e.g., flanges, gaskets, supports, and/or other outwardly extending members) shaped to contact, for example, at least one exterior surface of component 50. An exterior sidewall S of body 102 can optionally include further instruments for maintaining tool 100 in a fixed position relative to aperture 52, e.g. stoppers, wipers, treading, etc., to prevent movement of body 102 relative to tool 100 and/or to improve sealing engagement of aperture 52 by tool 100. Body 102 and sealing element(s) 103 can remain in a fixed position as tool 100 operates to prohibit fluid communication between hollow interior H and exterior E by means other than the various passages defined within body 102. Body 102 may take the form of any simple or composite geometry for engaging aperture(s) 52 shaped similarly to at least part of body 102. Body 102 is shown to be substantially cylindrical in FIG. 2 and further embodiments discussed herein, but it is also understood that body 102 may take other shapes. For instance, the geometrical profile of body 102 may include one or more other substantially polyhedral non-polyhedral shapes, e.g., spherical-shaped, pyramidal-shaped, conically-shaped, frusto-conical shaped, hexahedral-shaped, octahedral-shaped, etc.

Regardless of how body 102 is shaped, body 102 of tool 100 can include several openings therein for transmitting compressed air, entrained material, and/or other materials into or out of component 50 when tool 100 is sealingly engaged thereto. Body 102 can include one or more first passages 104 for providing limited fluid communication from exterior E to hollow interior H of component 50. First passage(s) 104 can be shaped to transmit a flow of compressed air from outside body 102 (e.g., from a source located at exterior E) into hollow interior H of component 50. First passage(s) 104 may be linearly shaped or non-linearly shaped. According to an example, each first passage 104 can extend inwardly from a perimeter sidewall S of body 102 and thereafter turn downward to pass through a lower surface of body 102. It is also understood that first passage(s) 104 can extend between different surfaces of body 102, e.g., linearly from a top surface of body 102 to a bottom surface of body 102, based on the shape and size of tool 100. First passage(s) 104 can have one end disposed, e.g., on a perimeter sidewall S of body 102. Body 102 can include one or more second passages 106 shaped to fluidly connect hollow interior H of component 50 to components located at exterior E of component 50, e.g., one or more material repositories as discussed herein.

The structural features of tool 100 can be used to remove unused material 54 from component 50. As shown, first passage(s) 104 may each be in fluid communication with a respective air conduit 124 outside body 102 for transmitting a compressed air into hollow interior H of component 50. Second passage(s) 106 may similarly be in fluid communication with one or more extraction conduits 126 outside body 102 for transmitting compressed air and removed unused material 54 out of component 50. Extraction conduit(s) 126 may be fluidly connected to a repository 136 for unused material positioned outside component 50. Air conduit(s) 124 may be fluidly connected to a compressed air supply 134 (e.g., one or more air compressors or compressed air reservoirs in fluid communication with air conduit 124) for physically driving extraction of unused material 54 from hollow interior H of component 50. Where multiple first passages 104 and compressed air supplies 134 are included, each first passage 104 can fluidly connect hollow interior H of component 50 to a respective compressed air supply 134 through a respective air conduit 124. Varying the number of compressed air supplies 134 connected to air conduit(s) 124 can allow a user to vary the extraction of unused material from component 50 for different applications. Extraction conduit(s) 126 can similarly be in fluid communication with multiple repositories 136 for receiving unused material 54 removed from hollow interior H of component 50 with compressed air as discussed herein.

Passages 104, 106 of body 102 may be fluidly connected to compressed air supplies 134 and repository 136 through conduits 124, 126, respectively, before operation begins. Embodiments of the present disclosure optionally can include fluidly connecting first passage(s) 104 to air conduit(s) 124 and compressed air supplies 134 before extracting unused material 54 from component 50. Methods according to the disclosure can optionally include fluidly connecting second passage(s) 106 to extraction conduit(s) 126 and repositories 136 before extracting unused material 54 from component 50. In still other embodiments, a user can additively manufacture component 50 and tool 100 together before using tool 100 to extract unused material 54 from component 50 as discussed herein.

A user can remove unused material 54 from hollow interior H of component 50 by injecting compressed air through first passages 104 to entrain unused material 54, and the entrained material can be extracted through second passage(s) 106 and extraction conduit 126 to repository 136. To remove unused material 54 from hollow interior H of component 50, methods according to the present disclosure can include, e.g., sealingly engaging tool 100 to component 50 at aperture 52 (FIG. 1). When engaged, body 102 of tool 100 can structurally separate hollow interior H of component 50 from exterior E. Further transmission of fluids and/or materials into or out of hollow interior H may only be possible through first and second passages 104, 106 of body 102 after tool 100 engages component 50. During engagement between tool 100 and component 50, sealing element 103 may also be pressed against one or more surfaces of component 50 to prevent or reduce fluid communication therebetween. In any event, first passage(s) 104 may be fluidly connected to compressed air supply 134 (e.g., through air conduit 124) and second passage 106 may be fluidly connected to repository 136 (e.g., through extraction conduit 126) when tool 100 engages component 50.

To remove unused material 54 from hollow interior H of component 50, a user of tool 100 can inject a compressed air from compressed air supply 134 through first passage(s) 104 into hollow interior H of component 50. The air injected into hollow interior H of component 50 may travel toward second passage 106, e.g., along the direction of lines P, by action of positive pressure between first and second passages 104, 106. Such movement of compressed air through hollow interior H can entrain unused material 54 for removal from hollow interior H, creating an entrained material 154. Entrained material 154 can travel to second passage 106, e.g., by action of positive pressure, to be extracted from hollow interior H of component 50. For example, entrained material 154 can be extracted from component 50 by the compressed air having a higher pressure than hollow interior H and repository 136. During operation, a user can optionally induce a vacuum through repository 136 by one or more conventional techniques (e.g., connecting a vacuum assembly to repository 136) to further increase the pressure differential between compressed air supply 134 and repository 136. Second passage 106 and extraction conduit 126 can then function as vacuum channels to extract air and entrained material 154 from hollow interior H. Forming a vacuum through repository 136 can facilitate movement of compressed air and entrained material 154 from hollow interior H during the use of tool 100.

Figure 3:
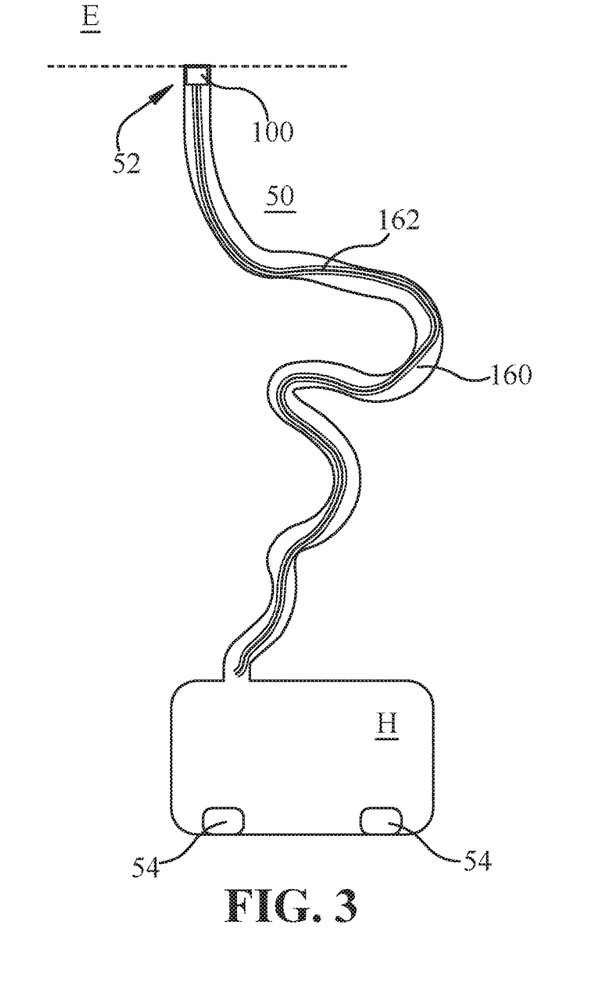
FIG. 3 shows a cross-sectional view of a material extraction tool within a laser-sintered component according to embodiments of the disclosure.

Referring to FIG. 3, hollow interior H of component 50 may be positioned at one or more alternative locations relative to exterior E, and may be separated by one or more intervening passages or components. A cross-sectional view of component 50 and tool 100 is shown in FIG. 3 is shown to demonstrate an example of such alternative configurations. As shown, a component passage 160 can fluidly connect hollow interior H with exterior E along a tortuous path including multiple bends, directional changes, etc., therein. To extract unused material 54 from hollow interior H of component 50, one or more components of tool 100 may be adapted to traverse component passage 160 to remove unused material 54 from component 50. To accommodate such situations, first and/or second passages 104, 106 (FIG. 2) may be fluidly coupled to a tube 162 shaped to traverse component passage 160. Where desired, air and extraction conduits 124, 126 (FIG. 2) can be embedded within tube 162 to provide fluid communication to hollow interior H through tool 100. According to an example, tube 162 (e.g., a hose, pipe, and/or other flexible or inflexible conduit) may include two or more fluid transmission pathways (oriented, e.g., coaxially) to transmit compressed air and extract unused material 54 therethrough as described herein. As such, tube 162 may include multiple pathways connected to first and/or second passages 104, 106 of tool 100 to serve as a combined air and extraction conduit 124, 126. It is also understood that multiple tubes 162 may extend through component passage 160 in further embodiments.

Figure 4:
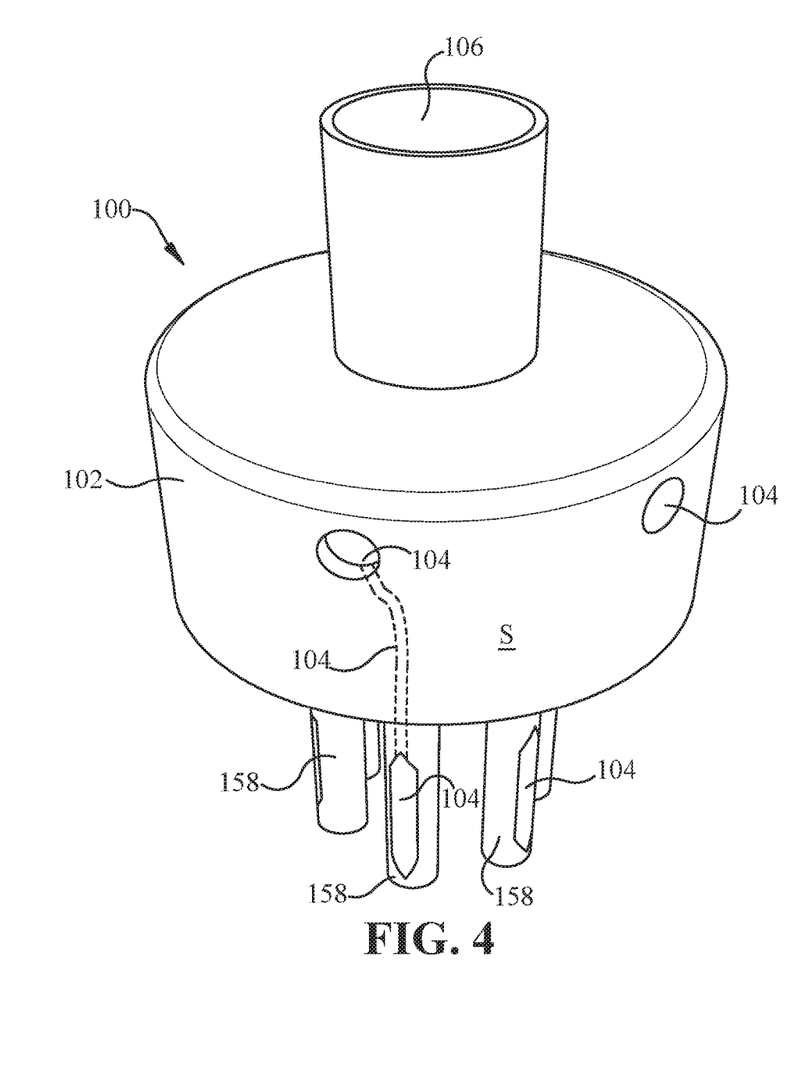
FIG. 4 provides a perspective view of a material extraction tool according to embodiments of the present disclosure.
Figure 5:
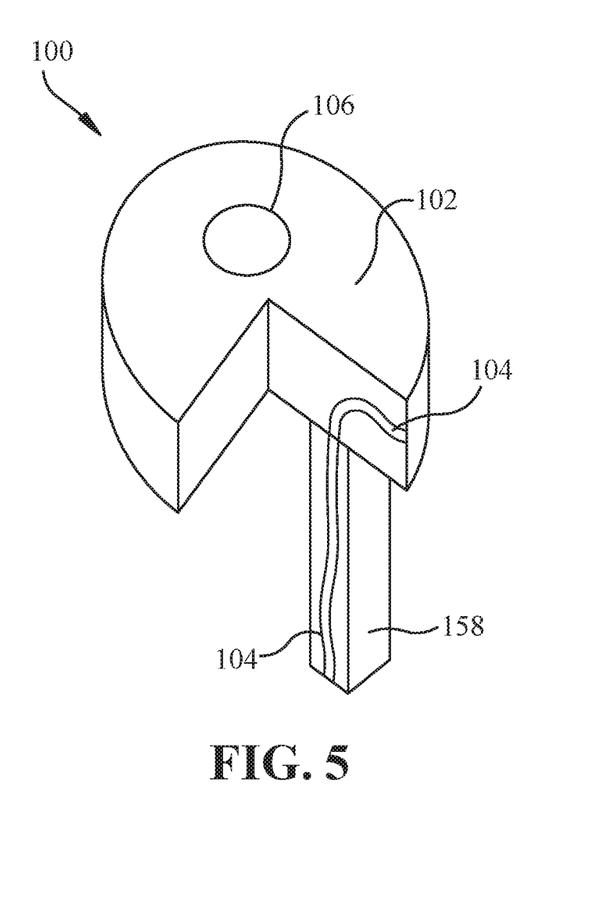
FIG. 5 provides a perspective cut-away view of a body, protrusion, and first passage of a material extraction tool according to embodiments of the present disclosure.

Referring to FIGS. 4 and 5 together, tool 100 can include one or more protrusions 158 extending from body 102 into hollow interior H of component 50. In the illustrated example, body 102 can be substantially cylindrical, with first passages 104 extending between perimeter sidewall P of body 102 and respective protrusions 158. Second passage 106 is shown to extend linearly between upper and lower surfaces of body 102 without extending through any portion of protrusion(s) 158. Each protrusion 158 may be composed of the same material as body 102, and/or may be composed of different materials. According to an embodiment, each protrusion 158 can extend from body 102 into hollow interior H of component(s) 50 being engaged by tool 100. Each protrusion 158 can include a portion of one first passage 104 therein, as demonstrated in the cut-away view of FIG. 5, to fluidly connect perimeter sidewall S of body 102 to hollow interior H such that first passage 104 passes through protrusion(s) 158. A portion of one first passage 104 is shown in phantom in FIG. 4 to provide an example of how first passage(s) 104 may fluidly connect perimeter sidewall S of body 102 to protrusion(s) 158. Protrusion(s) 158 may be provided in any desired geometrical and/or non-geometrical arrangement, and may be evenly or unevenly distributed in across portions of tool 100. The size, shape, number, and position of protrusion(s) 158 may be adjusted to accommodate varying components and/or expected positions, amounts, types, etc., of unused material to be removed. It is also understood that portions of second passage(s) 106 may extend through protrusion(s) 158 in alternative embodiments.

Figure 6:
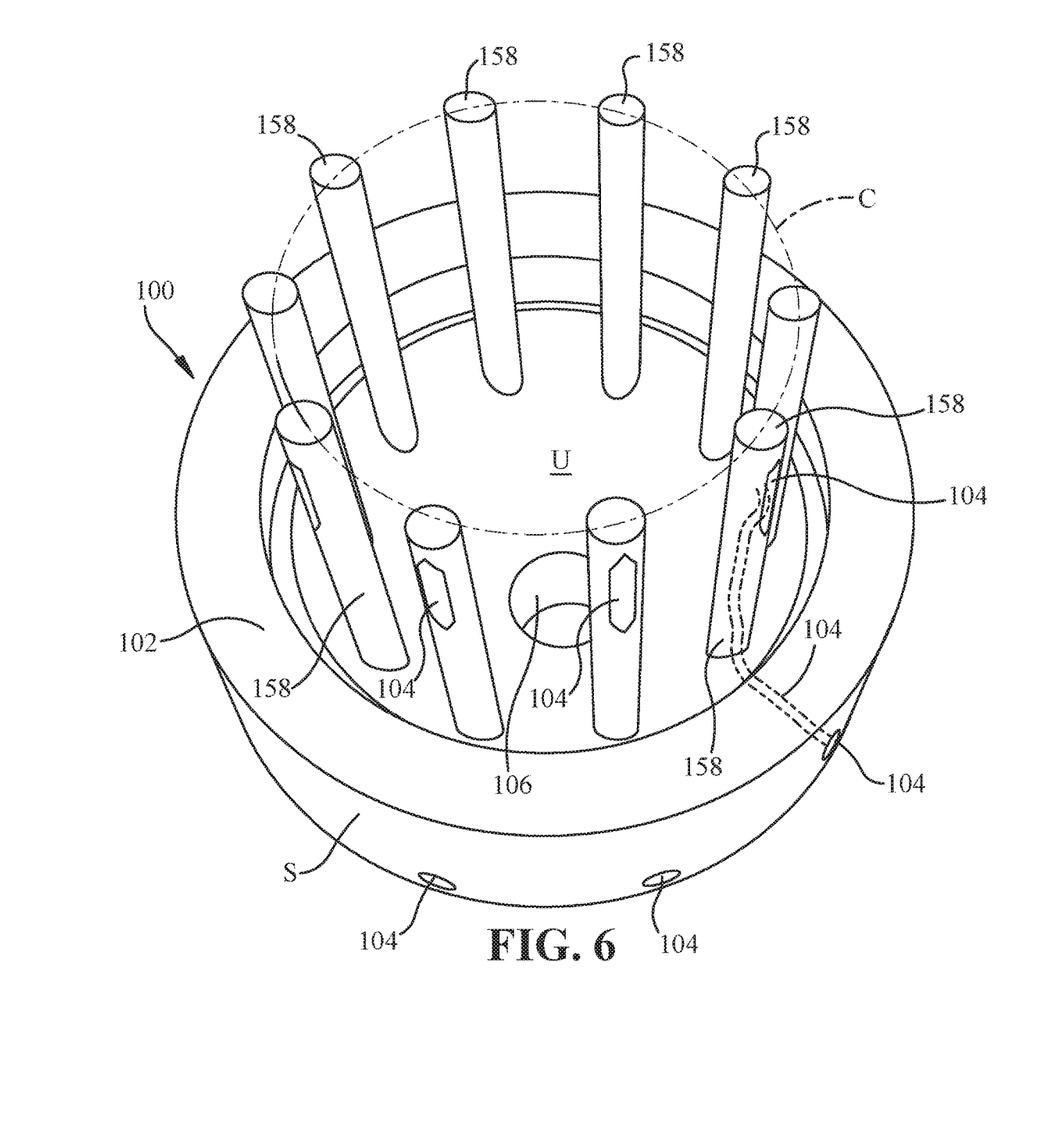
FIG. 6 provides another perspective view of a material extraction tool according to embodiments of the present disclosure.

Turning to FIG. 6, another view of tool 100 is shown to further demonstrate features and arrangements of protrusions 158. Body 102 can include an interior surface U from which each protrusion 158 extends. Protrusions 158, as shown, may be provided in a substantially circular, ovular, or otherwise rounded arrangement along line C about the perimeter of second passage 106 of body 102. In alternative embodiments, protrusions 158 can be arranged in other ways such as a linear, a triangular, quadrilateral, and/or other geometrical arrangement similar to or different from the profile of body 102, and/or any other desired arrangement to accommodate different types of components 50. As also shown by example in FIG. 6, an entrance to first passage(s) 104 in each protrusion 158 may be oriented radially outward from the center of body 102 and/or second passage 106, on perimeter sidewall S. In alternative embodiments, one or more protrusions 158 may have different orientations relative to the shape of body 102 and/or the position of second passage 106. For example, protrusion(s) 158 can optionally extend outwardly at a non-perpendicular angle relative to interior surface U.

Figure 7:
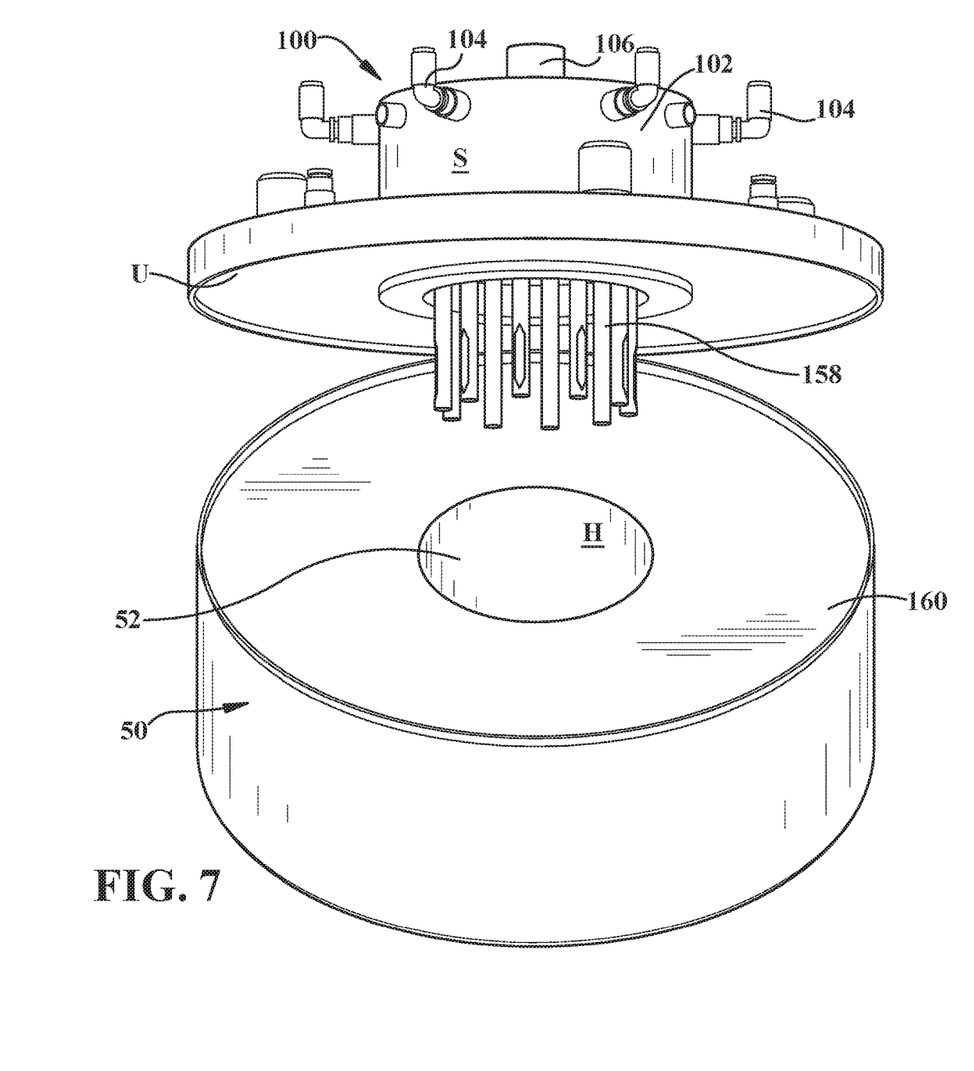
FIG. 7 provides a perspective view of a material extraction tool being coupled to a component according to embodiments of the present disclosure.

FIG. 7 shows an embodiment of tool 100 in the process of engaging component 50. As noted elsewhere herein, component 50 may form part of, or may be adaptable to form part of, a larger component and/or machine such as a power generation assembly. It will be understood, however, that component 50 may have applications other than those described by example herein. In an example embodiment, component 50 can have a substantially cylindrical geometry with one or more exterior surfaces 160, and one or more apertures 52 which fluidly connect hollow interior H to the exterior of component 50. Embodiments of tool 100 can be shaped to engage aperture 52 to remove unused material 54 (FIGS. 1-3) from hollow interior H of component 50. Components 50 which include multiple apertures 52 can be shaped to accommodate multiple tools 100, with each tool 100 engaging a respective aperture 52 of component 50. After being used to remove unused material 54, tool(s) 100 can be disengaged from component 50 to expose aperture 52, e.g., to receive other structures to form part of another structure, machine, etc.

Tool 100 and component 50 may each be composed of a sintered metal, and in some cases may be formed together as part of an additive manufacturing process as discussed herein. In additive manufacture, one or more components (e.g., component 50, tool 100, etc.) may be assembled by a fabricating device in a predetermined direction before further processing to define a desired structure. A build direction for a given component and/or sub-component therefore defines the order in which structural features are formed over time as raw materials (e.g., metallic powder or grains) are sintered to form a structure. Such materials can include, e.g., one or more pure metals and/or alloys including without limitation: Copper (Cu), Chromium (Cr), Titanium (Ti), Nickel (Ni), aluminum (Al), etc. However shaped, oriented, etc., component 50 and/or tool 100 may be composed of one or more laser-sintered metals or metallic materials, e.g., those currently-known or later developed for use in an additive manufacturing process.

Figure 8:
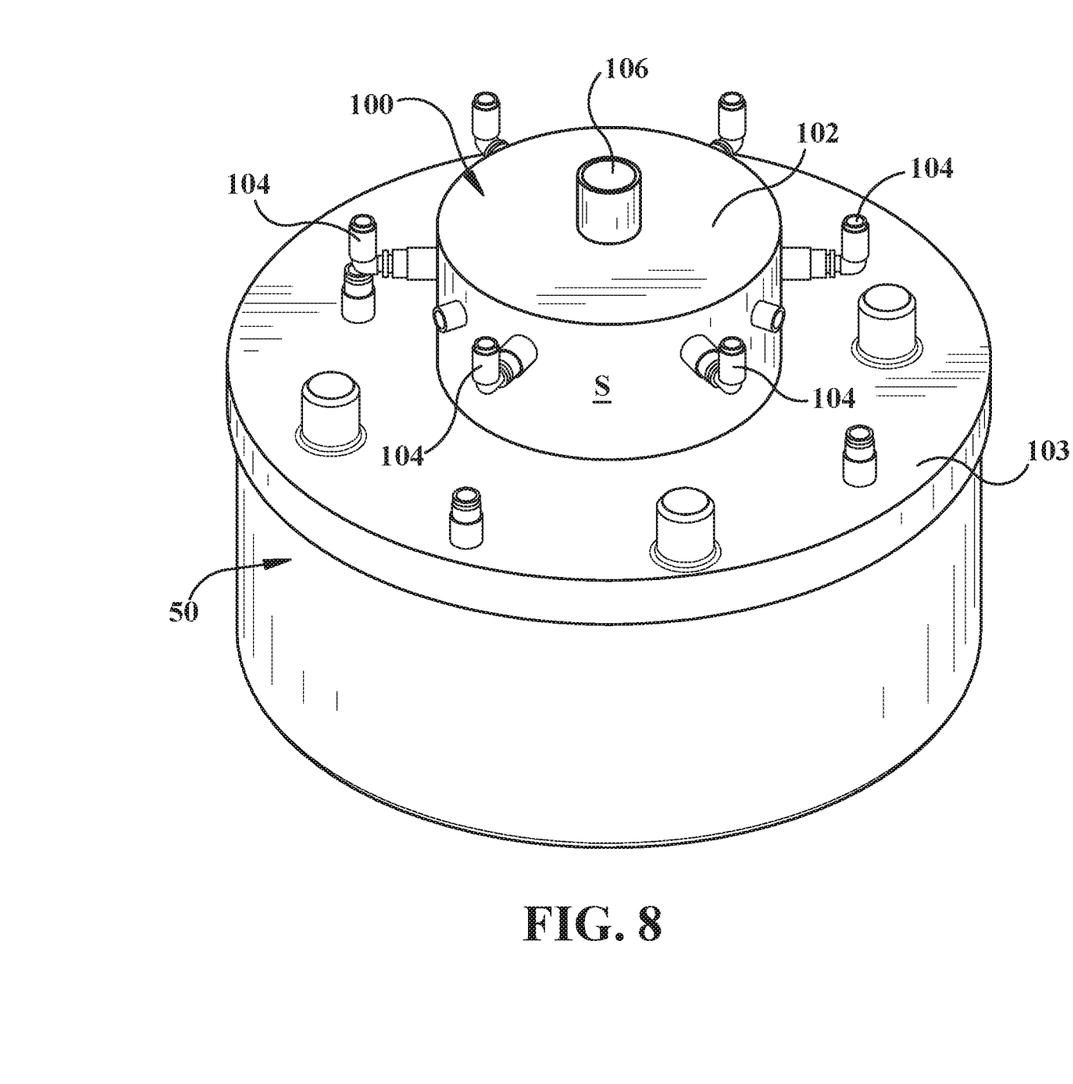
FIG. 8 provides a perspective view of a material extraction tool after being coupled to a component according to embodiments of the present disclosure.

Referring to FIGS. 7 and 8 together, a process of engaging tool 100 to component 50 to extract unused material 54 (FIGS. 1-3) is shown. FIG. 7 depicts tool 100 before physically engaging component 50. FIG. 8 depicts tool 100 engaging component 50. As shown, tool 100 can optionally include a sealing member 103 coupled to perimeter sidewall S of body 102 and extending radially outwardly therefrom. Flange 103 can be shaped to physically contact corresponding exterior surface(s) 160 (FIG. 7 only) of component 50 when tool 100 is engaged thereto. Where included, protrusions 158 can extend through aperture 52 beyond the thickness of exterior surface 160, as also illustrated in FIG. 2. First and second passage(s) 104, 106 within body 102 can thereby be in fluid communication with hollow interior H (FIG. 7 only) of component 50. Hollow interior H of component 50 may also be in fluid communication with other components (e.g., one or more air supplies 134 or repositories 136 (FIG. 2)) through second passage 106 of tool 100 as discussed elsewhere herein. As shown in FIG. 8, tool 100 can substantially prevent any communication of materials, fluids, etc., into or out of component 50 when sealingly engaged thereto. Instead, first and second passages 104, 106 can allow limited forms of passage into or out of hollow interior H of component 50 as discussed herein.

Figure 9:
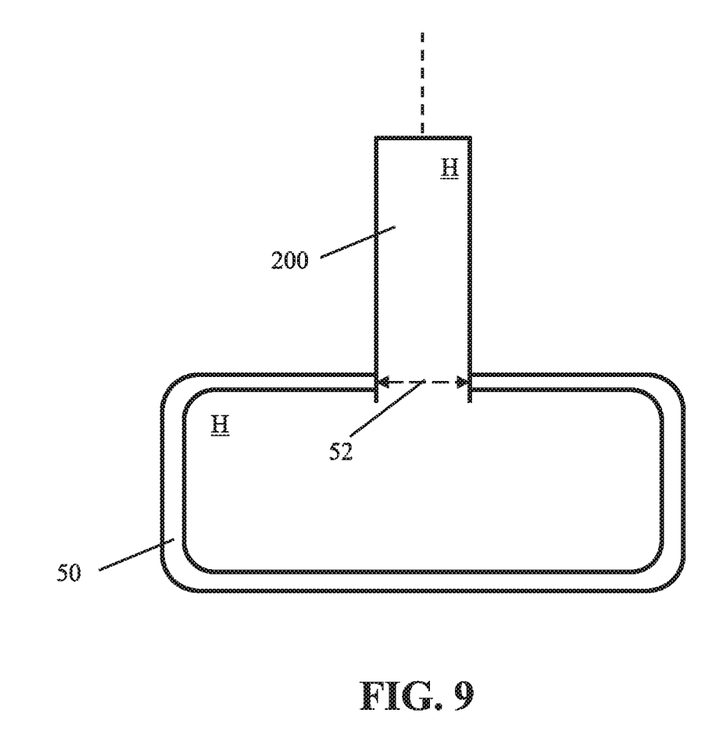
FIG. 9 shows a cross-sectional view of a component being coupled to another component after unused material is removed therefrom according to the present disclosure.

Referring to FIGS. 2 and 9 together, compressed air can be circulated from first passage 104 to second passage 106 through hollow interior H of component 50 until unused material 54 is converted to entrained material 154, and thereafter partially or completely removed from hollow interior H of component 50. Methods according to the disclosure can partially or completely remove unused material 54 from hollow interior H as entrained material 154 by action of air injected from compressed air supplies 134. Entrained material 154 collected in repository 136 can then be disposed and/or recycled for use in later-manufactured components. Thereafter, tool 100 can then be disengaged from component 50 to unseal aperture 52. An additional component 200 can then be mechanically coupled to component 50, e.g., through aperture 52 of component 50. Component 200 also may include a hollow interior H from which unused material may have been previously extracted according to the present disclosure, thereby reducing or eliminating remaining unused materials from each component 50, 200. Successive components with unused materials removed therefrom may be successively joined together in a similar fashion. In addition, tool(s) 100 may be reused for successive components 50, 200, etc., to remove unused materials without additional tools 100 being manufactured. Thus, tool 100 may be fabricated for use with multiple components 50, 200, or multiple tools 100 may be fabricated for use with differently shaped components 50, 200, e.g., including different types of apertures 52.

The above-described tool 100, component 50, and parts thereof can be manufactured using any now known or later developed technologies, e.g., machining, casting, etc. In one embodiment, however, additive manufacturing is particularly suited for manufacturing body 102, first passage(s) 104, second passage(s) 106, protrusion(s) 158, etc. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous. It is also understood that tool 100, component 50, and parts thereof can also be produced by any currently known or later-developed manufacturing technique, which may include or not include "three-dimensional printing" or similar processes which may incorporate computer-readable media and/or fabrication instructions. Thus, component 50 and/or tool 100 may be produced by one or more subtractive techniques (e.g., successively removing portions of layers in a prefabricated structure) through processes modified from or otherwise similar to AM techniques described herein.

Figure 10:
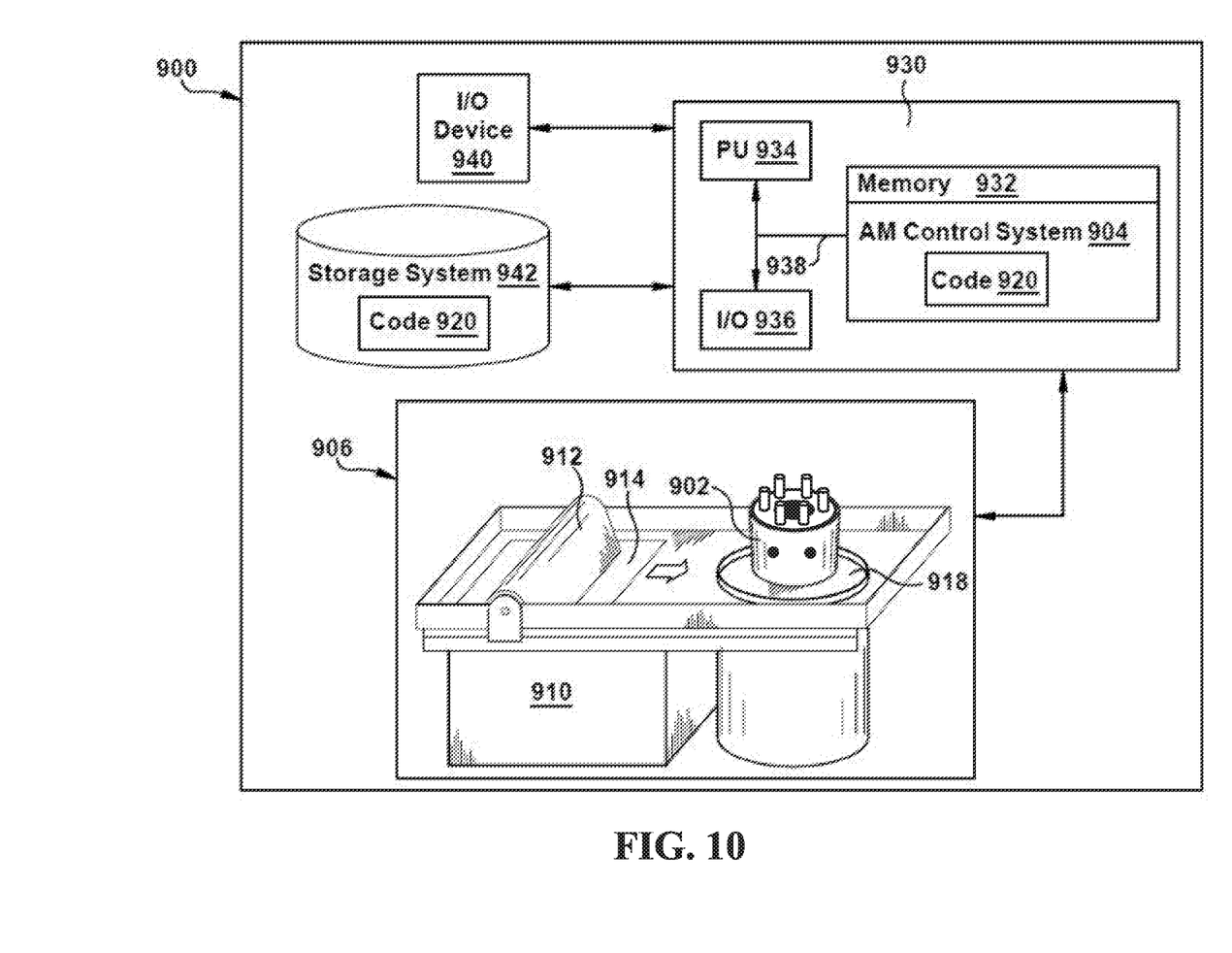
FIG. 10 shows a block diagram of an additive manufacturing process including a non-transitory computer readable storage medium storing code representative of a material extraction tool according to embodiments of the disclosure.

To illustrate an example additive manufacturing process, FIG. 10 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture tool 100 (FIGS. 2-9). AM system 900 generally includes a computerized additive manufacturing (AM) control system 904 and an AM printer 906. AM system 900, as will be described, executes code 920 that includes a set of computer-executable instructions defining tool 100 (FIGS. 2-9) to physically generate one or more of these objects using AM printer 906. Each AM process may use different raw materials in the form of, for example, fine-grain powder, liquid (e.g., polymers), sheet, etc., a stock of which may be held in a chamber 910 of AM printer 906.

In the instant case, tool 100 (FIGS. 2-9) may be made of stainless steel or similar materials. As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where the material is a polymer. In the example shown, a laser or electron beam 916 fuses particles for each slice, as defined by code 920. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of tool 100 (FIGS. 2-9), described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of tool 100 (FIGS. 2-9). As noted, code 920 includes a set of computer-executable instructions defining outer electrode that can be used to physically generate the tip, upon execution of the code by system 900. For example, code 920 may include a precisely defined 3D model of outer electrode and can be generated from any of a large variety of well-known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing tool 100 (FIGS. 2-9) and its features and/or subcomponents, discussed herein, into a series of thin slices that it assembles using AM printer 906 in successive layers of liquid, powder, sheet or other material. In the DMLM example, each layer is melted to the exact geometry defined by code 920 and fused to the preceding layer. Subsequently, the outer electrode may be exposed to any variety of finishing processes, e.g., minor machining, sealing, polishing, assembly to other part of tool 100.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A material extraction tool, comprising:
   a body shaped to sealingly engage an aperture in a component formed of an additively manufacturable powder, the aperture defining a fluid connection between a hollow interior of the component and an exterior of the component, and wherein the aperture of the component is shaped for mechanical coupling between the component and a different structure, wherein an orientation of the aperture defines an axial orientation of the body;
   a plurality of protrusions coupled to the body shaped to extend into the hollow interior of the component;
   a plurality of first passages within the body, the plurality of first passages fluidly connecting the hollow interior of the component to an air conduit outside the body, the air conduit fluidly coupled to a compressed air supply, wherein each of the plurality of first passages includes an outlet through a respective one of the plurality of protrusions, and the outlet oriented radially outwardly from a center of the body and oriented perpendicularly with respect to the axial orientation of the body; and
   a second passage within the body oriented in parallel with the axial orientation of the body and axially displaced from the first passages, the second passage fluidly connecting the hollow interior of the component to an extraction conduit outside the body, the extraction conduit fluidly coupled to a material repository positioned outside the hollow interior of the component, wherein a pressure differential between the compressed air supply and the material repository is operable to extract residual portions of the additively manufacturable powder from the hollow interior of the component.

2. The tool of claim 1, further comprising a sealing element coupled to the body, and shaped to contact a surface of the component.

3. The tool of claim 1, wherein the additively manufacturable powder includes a sintered metal.

4. The tool of claim 1, wherein the body includes a perimeter sidewall and the plurality of first passages extends through the perimeter sidewall of the body.

5. A component comprising:
   a component body formed of a sintered metal and having a hollow interior;
   a material extraction tool mounted on a surface of the component body, and having a tool body sealingly coupled to the component body, wherein the tool body defines an axial orientation of the tool body and the material extraction tool includes:
     a plurality of protrusions coupled to the body shaped to extend into the hollow interior of the component;
     a plurality of first passages within the tool body, the plurality of first passages fluidly connecting the hollow interior of the component body to an air conduit outside the component, the air conduit fluidly coupled to a compressed air supply, wherein each of the plurality of first passages includes an outlet oriented radially outwardly from a center of the tool body, and the outlet is oriented perpendicularly with respect to the axial orientation of the tool body, and
     a second passage within the tool body oriented in parallel with the axial orientation of the tool body, the second passage fluidly connecting the hollow interior of the component body to an extraction conduit outside the component, the extraction conduit fluidly coupled to a material repository positioned outside the hollow interior of the component body; and
   a sealing element interposed between the component body and the material extraction tool,
   wherein the material extraction tool defines a sole fluid connection between the hollow interior of the component body and an exterior of the component and the plurality of first passages and second passage are axially displaced.

6. The component of claim 5, wherein the material extraction tool includes a perimeter sidewall distinct from the surface of the component body, and the plurality of first passages extends through the perimeter sidewall of the material extraction tool.

7. An apparatus comprising:
   a turbine diaphragm formed of a sintered metal and having a hollow interior;
   a material extraction tool mounted on a surface of the turbine diaphragm through an aperture shaped for mechanical coupling to a different turbine component, and having a tool body sealingly coupled to the turbine diaphragm, wherein the aperture defines an axial orientation of the tool body and the material extraction tool includes:
     a first passage within the tool body, the first passage fluidly connecting the hollow interior of the turbine diaphragm to an air conduit outside the component, the air conduit fluidly coupled to a compressed air supply, first passage includes an outlet, the outlet oriented radially outwardly from a center of the body and oriented perpendicularly with respect to the axial orientation of the tool body, and a second passage within the tool body oriented in parallel with the axial orientation of the body, the second passage fluidly connecting the hollow interior of the turbine diaphragm to an extraction conduit outside the component, the extraction conduit fluidly coupled to a material repository positioned outside the hollow interior of the turbine diaphragm; and a sealing element interposed between the turbine diaphragm and the material extraction tool, wherein the material extraction tool defines a sole fluid connection between the hollow interior of the turbine diaphragm and an exterior of the component and the first passage and second passage are axially displaced.

8. The apparatus of claim 7, wherein the first passage of the material extraction tool includes a plurality of first passages each fluidly coupling the hollow interior of the diaphragm body to a respective one of a plurality of air conduits.

9. The apparatus of claim 8, wherein each passage of the plurality of first passages extends through the surface of the turbine diaphragm about a perimeter of the second passage.

10. The apparatus of claim 7, wherein the material extraction tool further includes at least one protrusion extending into the hollow interior of the turbine diaphragm, wherein the first passage extends through the at least one protrusion.

11. The apparatus of claim 7, wherein the material extraction tool includes a perimeter sidewall distinct from the surface of the turbine diaphragm, and the first passage extends through the perimeter sidewall of the material extraction tool.

\* \* \* \* \*